United States Patent [19]
Hornung et al.

[11] Patent Number: 5,520,270
[45] Date of Patent: May 28, 1996

[54] TANK STRUCTURE FOR HOLDING LIQUID ESPECIALLY IN A SPACECRAFT

[75] Inventors: Ernst Hornung, Stuhr; Huba Oery, Aachen; Herbert Wenz, Lemwerder, all of Germany

[73] Assignee: Daimler-Benz Aerospace AG, Munich, Germany

[21] Appl. No.: 415,422

[22] Filed: Apr. 3, 1995

Related U.S. Application Data

[63] Continuation-in-part of Ser. No. 27,857, Mar. 8, 1993, abandoned.

[30] Foreign Application Priority Data

Mar. 6, 1992 [DE] Germany .......................... 42 07 061.9

[51] Int. Cl.⁶ .................... F02K 9/60; F16F 9/10
[52] U.S. Cl. .................. 188/266; 188/378; 188/382; 285/49; 220/562
[58] Field of Search .................. 220/563, 562; 188/378, 266, 382, 314, 379, 380, 268; 267/136, 182, 140.11, 113; 114/74 R, 243, 392; 137/574; 244/135 R, 130; 248/559; 138/111–115, 39; 174/42, 101.5; 285/497; 367/191; 52/84, 167 R, 167 DF

[56] References Cited

U.S. PATENT DOCUMENTS

| 2,850,083 | 9/1958 | Frost .......................... 220/563 |
| 3,108,766 | 10/1963 | Beckman . |
| 3,208,696 | 9/1965 | Kastan ................. 244/135 R |
| 3,304,724 | 2/1967 | Blumrich et al. .......... 244/135 R |
| 3,352,118 | 11/1967 | Burkhardt . |
| 3,420,477 | 1/1969 | Howard ................. 244/135 R |
| 3,454,051 | 7/1969 | Goepfert et al. . |
| 3,597,779 | 8/1971 | Morgan . |
| 3,645,416 | 2/1972 | Main, Jr. .................. 220/563 |
| 3,693,913 | 9/1972 | Barland, Sr. et al. . |
| 3,804,210 | 4/1974 | Erickson . |
| 3,884,173 | 5/1975 | Fabula . |
| 3,979,005 | 9/1976 | Robinson et al. ........ 244/135 R |
| 4,013,190 | 3/1977 | Wiggins et al. .......... 220/563 |
| 4,146,052 | 3/1979 | Bubik et al. ............. 137/574 |
| 4,169,558 | 10/1979 | Coates ................... 220/563 |
| 4,193,234 | 3/1980 | Wong . |
| 4,251,005 | 2/1981 | Sons et al. .............. 220/563 |
| 4,589,526 | 5/1986 | Chang et al. ............ 188/271 |
| 4,829,929 | 5/1989 | Kerfoot . |
| 4,842,006 | 6/1989 | Scheurenbrand et al. ...... 137/574 |
| 4,844,278 | 7/1989 | Freiwald et al. . |
| 4,858,778 | 8/1989 | Patrick ................... 220/563 |
| 4,863,055 | 9/1989 | Bietz .................... 220/563 |
| 4,951,704 | 8/1990 | Reber ................... 137/574 |
| 4,976,398 | 12/1990 | Bruhn ................. 244/135 R |
| 5,031,795 | 7/1991 | Kotera et al. . |
| 5,042,751 | 8/1991 | Kolom .............. 244/135 R |
| 5,214,244 | 5/1993 | Cummings et al. . |
| 5,232,246 | 8/1993 | Page ..................... 220/563 |
| 5,279,323 | 1/1994 | Grove et al. ............ 137/574 |

FOREIGN PATENT DOCUMENTS 1692905   11/1991   U.S.S.R. ................... 220/563

*Primary Examiner*—Douglas C. Butler
*Attorney, Agent, or Firm*—W. G. Fasse; W. F. Fasse

[57] ABSTRACT

Vibrations of pipes or other components installed in a container such as a tank intended for holding liquids, are damped by surface area damping bodies, e.g. plates with through-holes that are immersed in the liquid in the container. These plates are rigidly connected to the pipes or components to be damped. The vibration damping plates are constructed of metal, for example, and the through-holes reduce the mass and advantageously affect the damping effect. The materials for making the perforated damping plates are selected to be compatible with the content of the containers, such as a fuel in a tank in a spacecraft. The surface area ratio of all cross-sectional areas of the through-holes to the total plate surface area is optimized to achieve a maximum damping effect. These perforated plates are secured to pipes, braces, filters, ducts, or other internal components of fuel tanks of land vehicles, aircraft, and spacecraft.

8 Claims, 2 Drawing Sheets

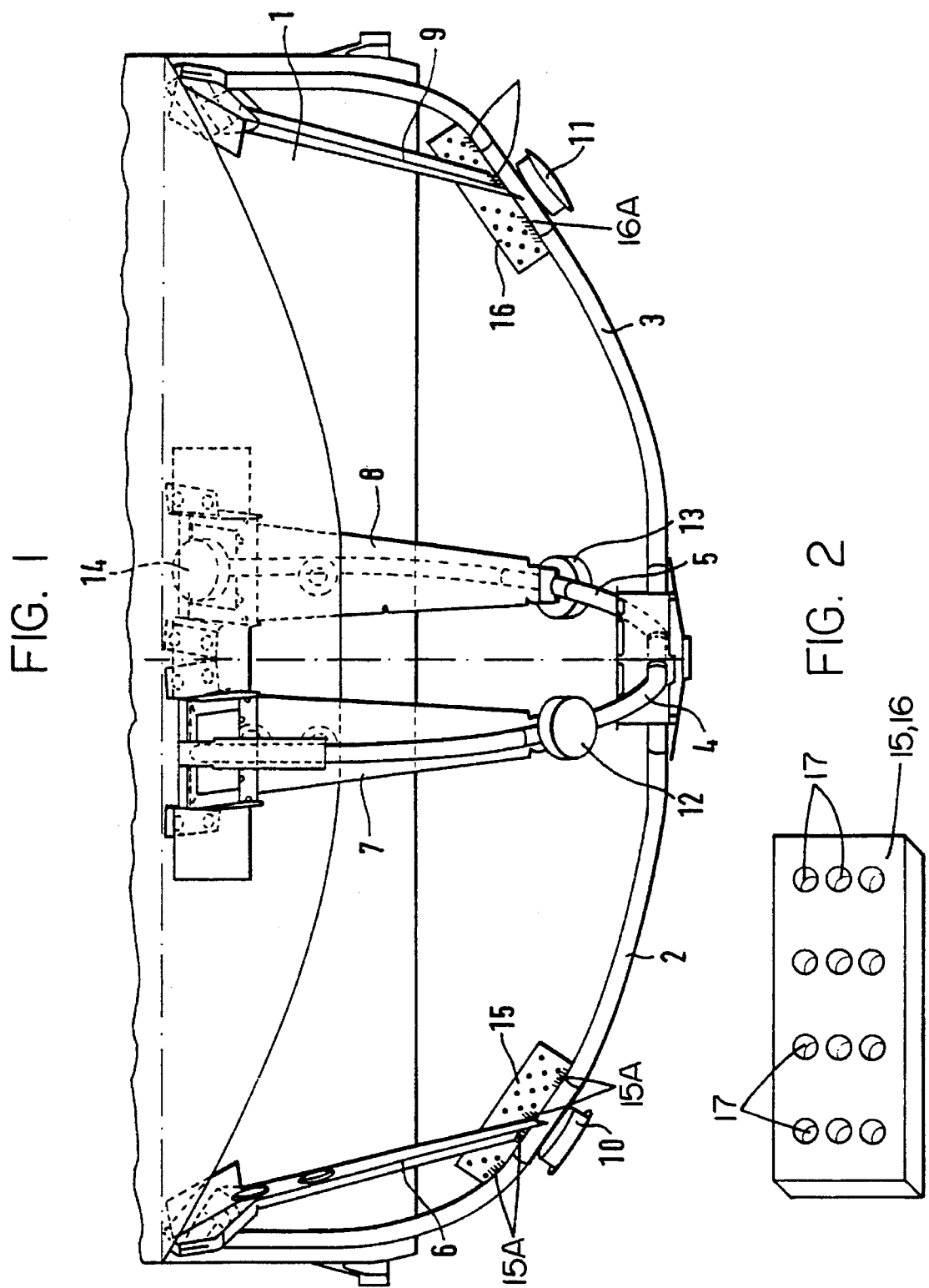

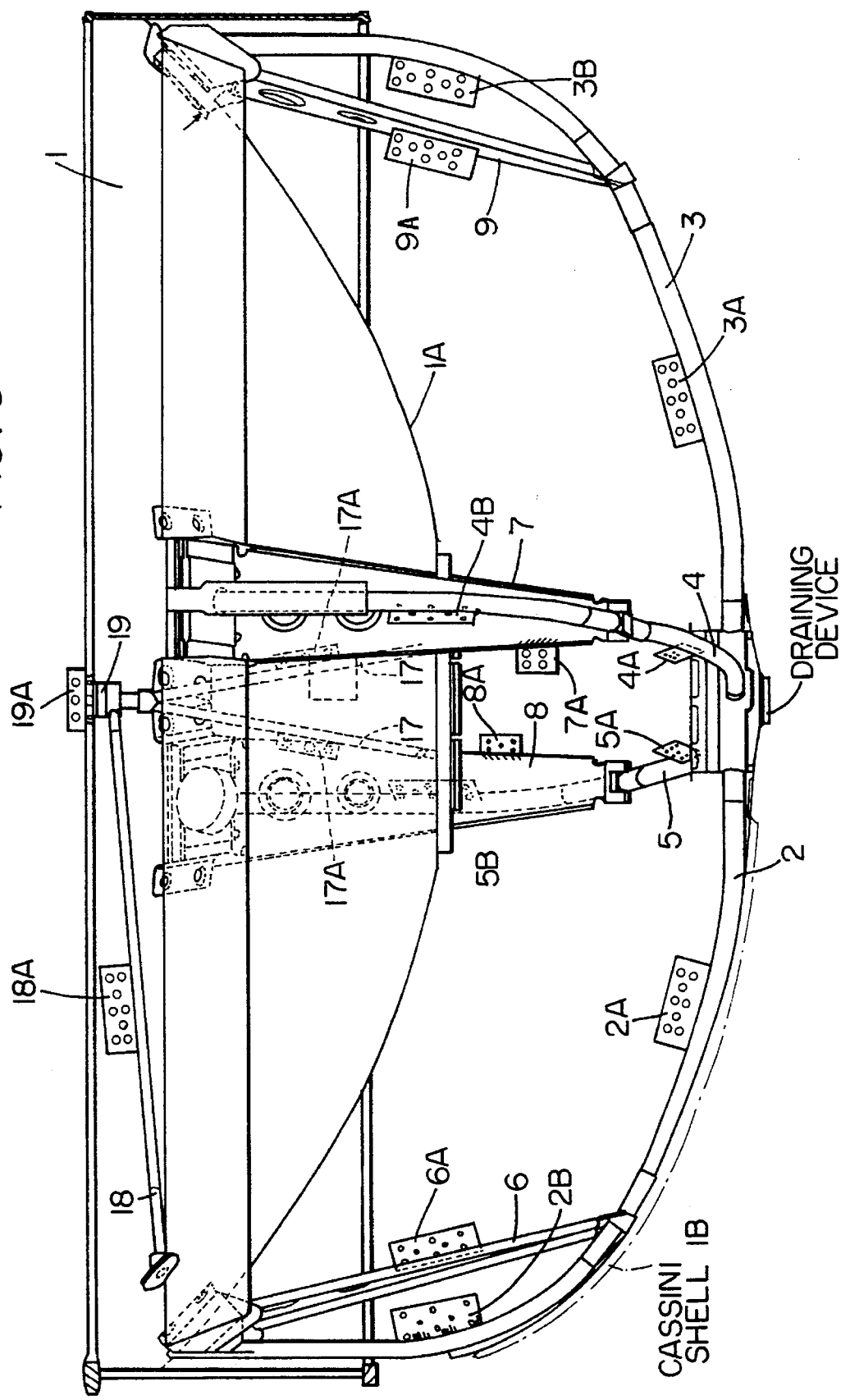

TANK STRUCTURE FOR HOLDING LIQUID ESPECIALLY IN A SPACECRAFT

CROSS-REFERENCES TO RELATES APPLICATIONS

The present application is a Continuation-In-Part application of out commonly assigned application U.S. Ser. No. 08/027,857, filed on Mar. 8, 1993, entitled: APPARATUS FOR DAMPING VIBRATIONS, ESPECIALLY IN CONTAINERS, which is now abandoned.

FIELD OF THE INVENTION

The invention relates to a liquid tank structure for holding liquid especially in a spacecraft. These tanks are equipped with a device for damping vibrations of structural components installed inside the tank. Such components are, for example, pipes, conduits, filters, braces and other installations inside filled tanks holding, for example fuel for vehicles, including land vehicles, aircraft, and particularly spacecraft.

BACKGROUND INFORMATION

Structural components installed inside liquid containers have a tendency to generate high resonance vibrations caused by movement of the tank, even if the tank is completely filled with liquid so that there is substantially no movement of liquid independently of any tank movement. Such response vibrations are triggered by input vibrations even if the tank is full of liquid. Such resonant vibrations are believed to be due to the rather small dynamic damping of these installed components in the tanks or rather of the vibrations of these components. As a result of these vibrations the components are exposed to substantial fatigue stress which can readily cause a fracture and thus lead to the failure of the particular structural component and even to failure of an entire mission.

The above mentioned vibrations have nothing to do with the problem of the so-called "sloshing effect" that occurs in liquid tanks that are not full and are moving. The sloshing effect occurs, for example, in fuel tanks in a moving vehicle. Various anti-sloshing devices are known for the purpose of retarding or calming the movement of a liquid in a tank. These devices are positioned inside the tank and are connected to the tank wall, see for example U.S. Pat. No. 4,844,278 (Freiwald et al.), issued Jul. 4, 1989, and U.S. Pat. No. 5,031,795 (Kotera et al.), issued Jul. 16, 1991.

It is also known to suppress oscillations or so-called "strumming" of structures immersed in a fluid flow, such as a smokestack exposed to wind flow, a periscope exposed to water flow, etc. The oscillation suppressing devices are attached to the outside surfaces of the structure for influencing the fluid flow pattern. See, for example, U.S. Pat. No. 3,804,210 (Erickson), issued on Apr. 16, 1974 or U.S. Pat. No. 3,884,173 (Fabula), issued on May 20, 1975.

OBJECTS OF THE INVENTION

In view of the above it is the aim of the invention to achieve the following objects singly or in combination:

to construct containers, such as fuel tanks, and particularly the components installed inside such containers, in such a way that any component vibrations inside the container are sufficiently damped when the container is filled or substantially filled with a liquid to thereby avoid premature component failure due to material fatigue;

to provide a simple, yet reliable vibration damping in such containers, and more particularly of pipes, conduits, filters, braces, and other installations inside such containers that are filled with a liquid;

to provide a vibration damping body that is especially suitable for use in filled fuel tanks for spacecraft and the like, which damping body does not significantly contribute to the weight of the tank; and to make the damping body of a material that is compatible with the liquid content in the tank in which the damping body is to be effective for the damping of vibrations of components installed in the container.

SUMMARY OF THE INVENTION

The above objects have been achieved according to the invention by rigidly connecting at least one damping body to the respective component installed inside a container or tank holding a liquid, wherein the damping body, such as a plate, has through-holes and a sufficient surface area for achieving the desired damping effect on the component to which the damping body is secured inside the tank. The damping body is preferably a perforated plate made of a material compatible with the content of the tank. Fuel compatible materials are for example titanium, aluminum, steel, and plastics. The connection between components to be damped and the damping body is accomplished by conventional connecting devices, such as welding, screws, soldering, riveting, or brazing. By securing a perforated damping body directly to the component installed in a tank, rather than to the container wall, the invention achieves a high damping effect while still keeping the required increase in the mass of the damping body relatively and advantageously low. In other words, a high damping efficiency or effect is achieved with a relatively low mass increase, whereby the present invention is particularly suitable for use in fuel tanks for spacecraft and aircraft. Optimal damping results have been achieved according to the invention while using an optimally small space for the installation of the damping bodies.

BRIEF DESCRIPTION OF THE DRAWINGS

In order that the invention may be clearly understood, it will now be described, by way of example, with reference to the accompanying drawings, wherein:

FIG. 1 shows the lower end of a fuel tank, partly broken away illustrating vibration damper bodies in the form of perforated plates secured to pipes inside a fuel tank e.g. for a spacecraft;

FIG. 2 is a perspective view of a perforated damping body having through-holes therein; and FIG. 3 is a view similar to that of FIG. 1, but showing vibration damping bodies also secured to other components inside the tank.

DETAILED DESCRIPTION OF PREFERRED EXAMPLE EMBODIMENTS AND OF THE BEST MODE OF THE INVENTION

A fuel tank 1 is only shown symbolically and partly broken away in FIG. 1 illustrating the interior of the fuel tank 1 for a spacecraft, such as a satellite equipped with thrusters for the position control of the satellite. Four fuel pipes or conduits 2, 3, 4, and 5 are shown inside the fuel tank 1. Additionally, stiffening braces 6, 7, 8, and 9 are provided to strengthen the respective pipe conduits 2, 3, 4, 5 and the tank 1. Each of the fuel pipes or conduits 2, 3, 4, and 5 is equipped with its own fuel filter or screen 10, 11, 12, 13, and 14 respectively.

According to the invention, the pipe or conduit 2 has connected thereto a perforated damping body or plate 15, for example by welding seams 15A. Similarly, the fuel conduit 3 has connected thereto a perforated damping body or plate 16, for example by welding seams 16A. These damping bodies 15 and 16 are so positioned, for instance in the middle, that they provide an optimum damping as long as perforations 17 in these plates are immersed in the liquid in the tank. A similar damping arrangement, not shown, is provided for the conduits 4 and 5. The perforated damping body or plate 15 is so positioned at the junction of the pipe 2 and the brace 6 that it damps vibrations of at least two, preferably three components, namely of the pipe 3, of the brace 6, and preferably also of the filter 10 which is connected to the pipe 2 at the junction of the pipe 2 with the brace 6. Similarly, the perforated damping body or plate 16 is positioned at the junction of the pipe 3 and the brace 9 to thereby damp vibrations of both the pipe 3 and the brace 9 and preferably also of the filter 11. The position of the damping bodies or plates 15 and 16 is such that these bodies may simultaneously function as a junction gusset which has a mechanical strengthening effect. This damping will be achieved, however, at locations with high vibration amplitudes.

FIG. 2 shows a vibration damping body 15, 16 having a relatively flat rectangular plate shape with holes or perforations 17 extending fully through the plate made of a material that is compatible with the liquid or fuel in the tank 1. Titanium, for example, has been found to be suitable for this purpose. However, aluminum, steel, and plastic materials are also suitable. The connections shown at 15A, 16A are, for example, welding seams. Soldering, brazing, riveting or screw connections are also suitable, whereby rivets and screws are particularly suitable when the damping bodies are connected to the braces or to the filters.

It has been found that a sufficient surface area is obtained for the damping purpose if the ratio of the sum L of all cross-sectional areas of the through-holes or perforations 17 in the damping plates 15, 16 to the entire surface area F of the damping plate is so selected that it falls within the range of 10 to 25%, specifically $L=(0.1 \text{ to } 0.25) \times F$. This surface area ratio has been found to be very efficient for the present damping purposes. However, other surface area ratios may also be suitable.

Although FIG. 1 only shows a few damping bodies 15, 16 for example, it has been found that it is advantageous to equip all pipes or conduits and other installed components in the tank with such damping bodies or plates, and, if necessary, to even provide more than one damping plate for each pipe or conduit.

In FIG. 3 each pipe 2, 3, 4, and 5 carries two vibration dampers 2A, 2B; 3A, 3B; 4A, 4B; and 5A, 5B, respectively. Each brace 6, 9 carries at least one vibration damper 6A, 9A, respectively. Braces 7 and 8 carry vibration dampers 7A and 8A, respectively. Bracing rods 17 carry vibration dampers 17A. A pipe or conduit 18 carries a vibration damper 18A. A filter 19 carries a vibration damper 19A. All vibration dampers function when they are immersed in liquid in the tank 1 which, in FIG. 3, has an intermediate bottom 1A and a so-called Cassini-shell 1B shown only partly with the remainder of the Cassini-shell being broken away.

The dampers in FIG. 3 also have holes and dimensions so that the above range for L is satisfied.

The present vibration damping bodies or plates must be at least partly immersed in liquid in the tank so that at least some of the holes are filled with liquid to achieve a damping effect which is greatest when all holes are filled with the liquid in the tank. These damping plates are connected to the components inside the tank and not to the inner tank wall.

Although the invention has been described with reference to specific example embodiments, it will be appreciated that it is intended to cover all modifications and equivalents within the scope of the appended claims.

What is claimed is:

1. A tank structure for holding liquid, comprising a wall forming a liquid container, at least one interior component selected from the group consisting of liquid flow pipes, ducts, stiffening braces, and filters installed inside said liquid container, said at least one interior component being prone to vibrate inside said liquid container because of movement of said tank causing vibrations unrelated to "sloshing effect" type vibrations, at least one damping body, and means rigidly securing said damping body to said at least one interior component inside said liquid container, said at least one damping body comprising through-holes passing through said at least one damping body for access of liquid into said through-holes for damping vibrations of said at least one interior component installed inside said tank.

2. The tank structure of claim 1, wherein said damping body is a flat perforated plate.

3. The tank structure of claim 2, wherein said flat perforated plate is made of a material compatible with a liquid in said tank.

4. The tank structure of claim 3, wherein said material of which said plate is made, is titanium, aluminum, steel, or plastic.

5. The tank structure of claim 1, wherein said means for rigidly securing is one of welding, soldering, brazing, rivets or screws.

6. The tank structure of claim 1, wherein said damping body has a total surface area F, wherein said holes have a total cross-sectional area L; and wherein L corresponds to about $(0.1 \text{ to } 0.25) \times F$.

7. The tank structure of claim 1, wherein said damping body is a perforated plate secured at a junction between a pipe and a brace.

8. The tank structure of claim 7, wherein a filter is connected to said junction.

\* \* \* \* \*